UNITED STATES PATENT OFFICE.

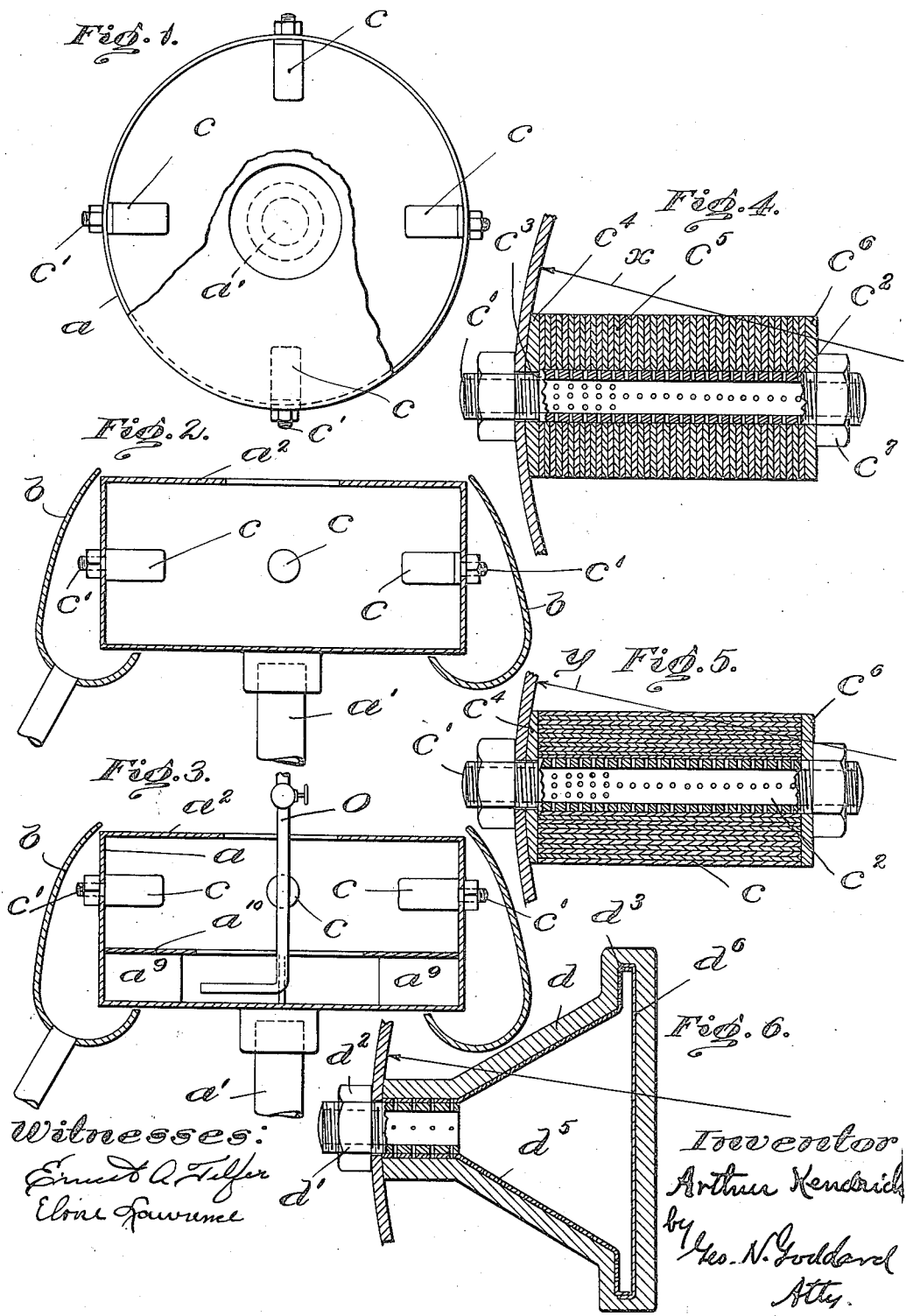

ARTHUR KENDRICK, OF NEWTON, MASSACHUSETTS, ASSIGNOR TO INTERNATIONAL INSTRUMENT COMPANY, OF CAMBRIDGE, MASSACHUSETTS, A CORPORATION OF MASSACHUSETTS.

CENTRIFUGAL FILTERING-MACHINE.

1,293,114.  Specification of Letters Patent.  Patented Feb. 4, 1919.

Application filed February 3, 1915. Serial No. 5,970.

*To all whom it may concern:*

Be it known that I, ARTHUR KENDRICK, citizen of the United States, and resident of Newton, Massachusetts, have invented certain new and useful Improvements in Centrifugal Filtering-Machines, of which the following is a specification.

This invention relates to filtering machines and is intended to provide a simple and efficient apparatus for filtering liquids containing very finely divided particles in a state of suspension.

The invention utilizes a pressure filter of porous material such as filter clay or filtering paper, or equivalent material, so arranged that the pressure of the exterior of the filtering medium or element is maintained by centrifugal action while at the same time centrifugal force tends to remove from the filtering surface particles strained out from the liquid, so as to prevent clogging of the filter.

These and other features of the invention will be hereinafter described in detail, and will be defined in the claims forming a part of this specification.

In the accompanying drawings, I have illustrated several forms embodying the principles of this invention, in which—

Figure 1 is a plan view showing the centrifugal receptacle with a series of filter tubes or elements in position.

Fig. 2 is a vertical section in elevation showing in addition the surrounding curb or collecting ring.

Fig. 3 shows a modified form of receptacle in sectional elevation.

Figs. 4, 5 and 6 show central horizontal sections of three different forms of filter tube or element.

In the practice of my invention according to the construction illustrated in the drawings, I provide a rotary centrifugal liquid receptacle $a$ mounted upon its driving shaft $a'$ and surrounded by a collecting ring or curb $b$, the latter being stationary. The receptacle $a$ has a partial cover $a^2$ over-hanging the peripheral portion of the receptacle to prevent the escape of liquid contents when the receptacle is rotated.

The peripheral or outer wall of the receptacle $a$ has a series of perforations adapted to receive the tubular necks $c'$ of a series of filter elements or candles $c$. These filtering tubes or candles may be made in a variety of forms, some of which are illustrated in the drawings. In the form shown in Fig. 4, the filtering element comprises a perforated tube $c^2$ whose outer end is reduced to form a neck $c'$, leaving the shoulder at $c^3$ to abut against a packing washer $c^4$ in order to make a tight joint around the exterior of the neck.

The filtering material may be of various sorts and may be applied in various ways. In Figs. 4 and 5, the filtering material is shown to be of filtering paper.

In Fig. 4, the paper is made in the form of a series of thin disks $c^5$, arranged side by side and clamped against the washer $c^4$ by means of the flange $c^6$ and the clamping nut $c^7$ which is screwed on the inner end of the tube $c'$.

An alternative form of paper filter is shown in Fig. 5, in which a long ribbon or sheet of filter paper is wound spirally around the perforated barrel of the tube $c^2$ between the washer $c^4$ and the flange or head $c^6$.

Instead of using sheets of filter paper, I may cover the exterior of the tube with porous earth or clay of a sufficient fineness to strain out or obstruct the passage of the particles which it is intended to remove from the liquid. The filtering element or tube, however, need not be cylindrical at all. A very convenient and effective form of filter element or tube is shown in Fig. 6, which is of a conical or mushroom shape. In this case, the outlet end or neck $d'$ of the tube is clamped in place by an exterior clamping nut $d^2$, while the tube or candle $d$ is outwardly flared toward the center of the basket and even mushroomed, as shown at $d^3$. In this case, I have shown an inner perforated tube or shell $d^5$ of metal or suitable material covered with clay. It is unnecessary to perforate the large end face $d^6$ of this element, and indeed, for reasons hereinafter explained, I prefer not to perforate the large end $d^6$, or if it is perforated, the outer face of the clay that covers it would preferably be covered with an impervious glaze.

When the receptacle $a$ is rotated at high speed, the liquid content is thrown out into the peripheral portion of the basket where the pressure is dependent upon the speed of rotation. This pressure thus maintained serves to force the liquid through the various filter tubes or filter elements, whence it passes through the outlet necks into the surrounding casing or collecting ring. It will be observed that in all the forms shown, the exterior surfaces of the filter elements, that is the surfaces through which the liquid enters, are disposed in such relationship to the radial lines of centrifugal force as to leave the particles that may be deposited upon the filtering surface free to be thrown off by centrifugal action. In other words, the arrangement of filtering surfaces to the lines of centrifugal force is such that the filtering elements are self-clearing. Consequently, as fast as the particles are deposited upon the exterior of the filtering elements, they are thrown off by centrifugal force, and thus the clogging of the pores of the filters by the filtered out deposit is automatically prevented. This relationship is shown by the radial arrows $x$ and $y$ in Figs. 4 and 5, and the action is even more obvious in the mushroom form shown in Fig. 6. It will be apparent that it is possible to give the tubes or filter elements a great variety of forms without departing from the principle of this invention.

The filter elements themselves are, of course, arranged around the peripheral portion of the basket in order to get the benefit of the greatest pressure of the liquid.

The apparatus may be constructed to perform a preliminary filtering operation to get rid of the coarser or heavier particles before the fine filtering is done by constructing the receptacle on the principle shown in Fig. 3, in which the receptacle $a$ is provided with a skimmer ring or flange $a^{10}$ mounted somewhat above the bottom of the receptacle. The inlet pipe $o$ is carried down and extended outwardly to feed the unfiltered liquid into the peripheral portion of the receptacle between the skimmer ring and the bottom of the receptacle. A series of radial wings $a^9$ serve to accelerate the revolution of the liquid.

While I have shown only four of the filter candles or elements in the basket, it will be understood that any desired number may be employed and that the receptacle is imperforate except for those perforations through which the necks of the filter elements are passed. Neither is it essential that the filter elements should project radially inwardly. All that is required is that they be arranged in the periphery of the basket where the liquid pressure is greatest, and in order to get the self-clearing action, their surfaces should be so disposed as to not obstruct the flying outwardly therefrom of the filtered out particles.

What I claim is:

1. A filtering machine embracing in combination a rotary receptacle for containing the liquid to be filtered; a series of hollow filter elements secured to the peripheral wall of said receptacle, each filter element being arranged to project inwardly from said peripheral wall and having at its outer end an outlet extended through the peripheral wall of the receptacle to allow the escape of the filtered liquid under centrifugal action, substantially as described.

2. A filtering machine embracing in combination a rotary centrifugal receptacle for the liquid, an annular skimmer ring secured to the peripheral wall of the receptacle inside its lower portion and extending for a distance toward the center, a series of hollow filter elements secured to the peripheral wall above said skimmer ring and projecting into said receptacle with their discharge outlets passing through said peripheral wall, substantially as described.

3. In a centrifugal filter the combination with a rotary centrifugal receptacle, a hollow filter element secured to the peripheral wall of said receptacle with its outlet tube passing through said wall, said hollow filter element being tapered with its smaller end adjacent to the peripheral wall whereby the filtered out particles arrested by the filtering surface are free to fly outwardly toward the peripheral wall unimpeded by the filtering surface, substantially as described.

4. The combination of a rotary centrifugal receptacle for liquid having apertures in its peripheral wall, a series of hollow filter elements composed of suitable filtering material and having screw-threaded outlet tubes adapted to pass through the respective apertures in said receptacle, and external clamping nuts for clamping the filter elements securely to said wall, substantially as described.

5. A filtering machine embracing in combination a rotary receptacle for containing the liquid to be filtered, a series of hollow filter elements mounted in the peripheral portion of said receptacle and provided with outlet ports at their outer ends arranged to discharge the filtered liquid outside of the receptacle under centrifugal action induced by the rotation of said receptacle, the porous filtering wall of each filtering element being disposed to lie within radial lines passing from the central axis of the receptacle and intersecting the innermost portions of the surface of said filtering wall whereby the solid particles separated from the liquid by the filter element are free to move outward on radial lines under centrifugal force, substantially as described.

In witness whereof I have subscribed the above specification.

ARTHUR KENDRICK.

In the presence of—
   Geo. N. Goddard,
   George A. Rockwell.